UNITED STATES PATENT OFFICE.

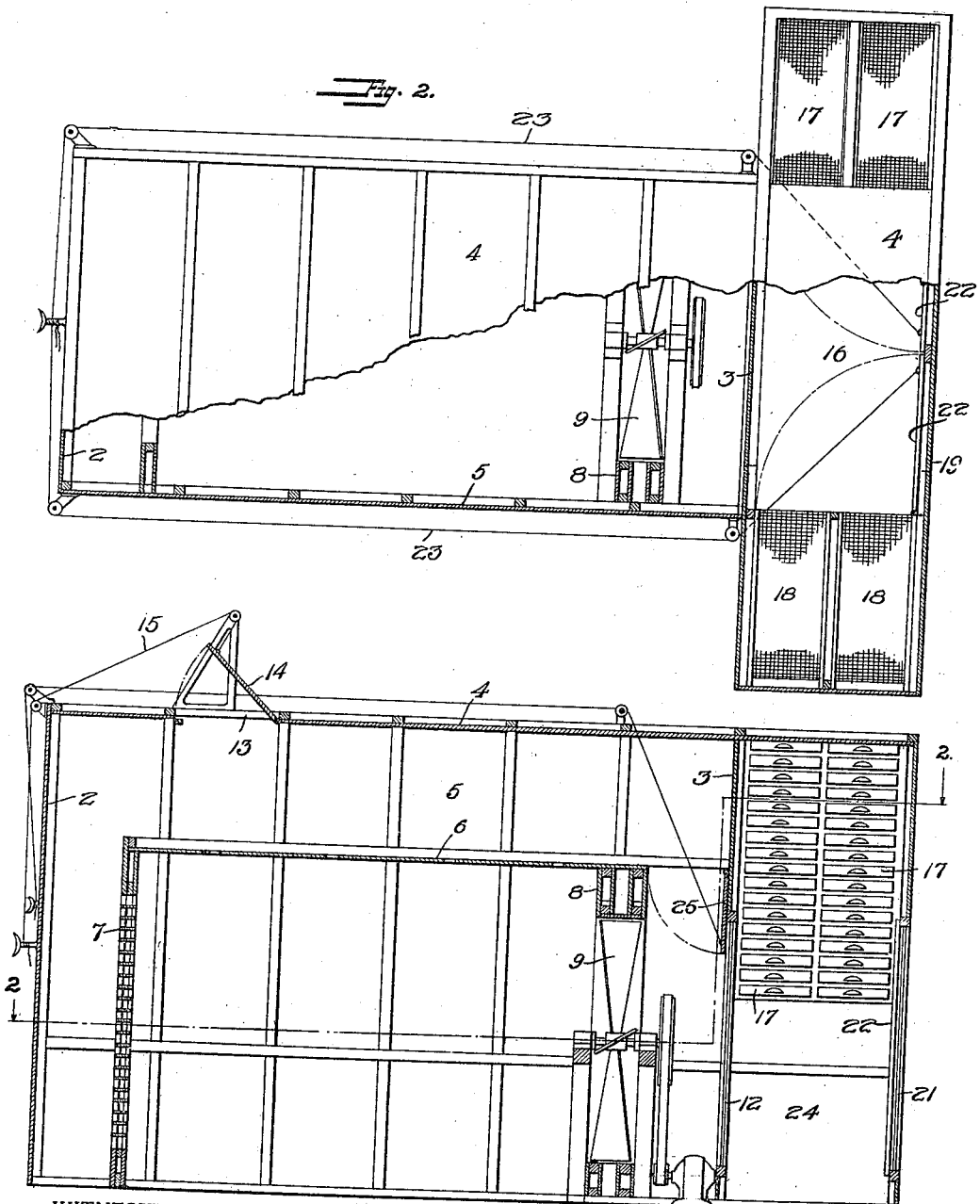

ARTHUR ROSSI, OF SAN FRANCISCO, CALIFORNIA.

PASTE-DRIER.

1,258,817.

Specification of Letters Patent.

Patented Mar. 12, 1918.

Application filed March 24, 1917. Serial No. 157,109.

*To all whom it may concern:*

Be it known that I, ARTHUR ROSSI, a subject of the King of Italy, and a resident of the city and county of San Francisco, State of California, have invented a certain new and useful Paste-Drier, of which the following is a specification.

The invention relates to an apparatus for drying paste, such as macaroni, spaghetti, etc.

An object of the invention is to provide a combined apparatus for drying long paste and cut paste.

A further object of the invention is to provide a convertible apparatus which may be used as a long paste drier or as a combined long paste and cut paste drier.

Another object of the invention is to provide an apparatus wherein one blower is employed for producing the necessary ventilation for drying both of the paste products.

The invention possesses other features of advantage, which, with the foregoing, will be set forth at length in the following description where I shall outline in full that form of the invention which I have selected for illustration in the drawing accompanying and forming part of the present specification.

Figure 1 is a longitudinal vertical section of the paste drier of my invention taken along its center line.

Fig. 2 is a plan view of the apparatus, partly in section, taken on the line 2—2, Fig. 1.

The drier comprises a hollow structure or chamber composed of the end walls 2—3, the top wall 4 and side walls 5. Arranged within the structure is a horizontal partition wall 6 which is spaced apart from the top wall 4 and the end walls 2—3. The chamber formed by the wall 6 is closed at one end by a vertical wall provided with an adjustable shutter 7 and at the other end by the vertical wall 8 in which is set the blower 9. The wall 3 is provided behind the blower with an opening 12. The chamber defined by the wall 6, the wall containing the shutter 7 and the wall 8 forms the long paste drying chamber. This chamber is provided with a suitable door and trucks carrying with racks of long paste are rolled into the chamber for the purpose of drying the paste. Air is admitted through an aperture 13 in the wall 4, the area of opening of which is controlled by a gate 14 which is moved by the rope 15. When the gate 14 is open, air is drawn through the opening 13, thence through the shutters 7, passes through the drying chamber and is discharged through the opening 12.

Arranged behind the wall 3 and communicating with the long paste drying chamber through the opening 12, is a chamber 16 which is flanked on both sides with tiers of drawers 17—18 in which the cut paste is placed for drying. The drawers are provided with perforated or screen bottoms to permit the passage of air upward through the tiers of drawers. The top wall 4 extends over the chamber 16 but does not extend over the tops of the drawers so that air may be forced by the blower up through the drawers. The rear wall 19 of the chamber 16 is provided with an opening 21 which is controllable by gates 22, which may be moved by ropes 23.

The tiers of drawers are spaced apart from the floor of the apparatus whereby passages 24 extending under the tiers of drawers are provided so that the air can enter under the lower drawers. The gates 22 are so arranged that when they are swung inward to open the aperture 21, they close the passages 24 extending under the drawers, whereby the air from the blower passes directly out through the aperture 21. When it is desirable to dry long paste only, the gates 22 are moved to open the aperture 21 and close the passages 24 against the entry of air to the drawers. When it is desirable to recirculate the air through the long paste chamber, for the purpose of producing slow drying or for other reasons, the gates 22 are moved to close the opening 21, the lower drawers of the tiers are filled with an impervious material or the pervious bottom lower drawers are supplanted by impervious bottom drawers and the gate 14 is closed. The wall 6 being spaced from walls 3 and 2 provides a path for the recirculation of the air. The opening between the wall 3 and the wall 6 is controlled by a gate 25, which when closed prevents recirculation and insures the passage of all of the air into the cut paste drying chamber.

When it is desirable to dry both long and cut paste, the gate 14 is opened, and gate 25 is closed and the aperture 21 is closed and the air from the long paste chamber is blown by the blower 9 into chamber 16 and up through the tiers of drawers. It is apparent that the convertible apparatus may be manipulated to dry long or cut paste, or both long and cut paste, and that the same blower provides the necessary air currents for accomplishing these results.

I claim:

1. In an apparatus for drying paste, a chamber adapted to receive racks of long paste and having a discharge opening, means for blowing air through said chamber and opening, a cut paste drying chamber communicating with said opening and means in said second chamber for controlling the air currents therein.

2. In an apparatus for drying paste, a chamber having a discharge opening, means for blowing air into said chamber, tiers of drawers arranged at the side of said chamber and spaced apart from the floor thereof, the chamber being open above said tiers of drawers, and a gate adapted in one position to close said opening and in another position to separate the space below the drawers from the chamber.

3. In an apparatus for drying paste, a chamber adapted to receive racks of long paste and having a discharge opening, means for blowing air through said opening, a supplementary chamber arranged to receive said air, tiers of perforated bottom drawers arranged at the side of said supplementary chamber and spaced apart from the floor thereof, forming beneath the drawers a passage communicating with the supplementary chamber, the said supplementary chamber being open above said drawers and being provided with a discharge opening and a gate adapted in one position to close said discharge opening of the supplemental chamber and in the other position to close the passage beneath the drawers.

4. In an apparatus for drying paste, a chamber adapted to receive racks of long paste and having a discharge opening, means for blowing air through said chamber and opening, a cut paste drying chamber communicating with said opening, a discharge opening in said cut paste drying chamber and a gate for controlling said second-mentioned discharge opening.

In testimony whereof, I have hereunto set my hand at San Francisco, California, this 5th day of March, 1917.

ARTHUR ROSSI.

In presence of—
H. G. Prost.

Copies of this patent may be obtained for five cents each, by addressing the "Commissioner of Patents, Washington, D. C."